US011906138B2

(12) United States Patent
Tang

(10) Patent No.: US 11,906,138 B2
(45) Date of Patent: Feb. 20, 2024

(54) LAMP BODY BRACKET AND LIGHTING DEVICE

(71) Applicant: Aputure Imaging Industries Co., Ltd., Shenzhen (CN)

(72) Inventor: Rong Tang, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 210 days.

(21) Appl. No.: 17/540,614

(22) Filed: Dec. 2, 2021

(65) Prior Publication Data

US 2023/0102978 A1 Mar. 30, 2023

(30) Foreign Application Priority Data

Sep. 28, 2021 (CN) ........................ 202122374535.3

(51) Int. Cl.

*F21V 17/02* (2006.01)
*F21V 21/15* (2006.01)
*F21V 17/06* (2006.01)

(52) U.S. Cl.

CPC .............. *F21V 17/02* (2013.01); *F21V 17/06* (2013.01); *F21V 21/15* (2013.01)

(58) Field of Classification Search

CPC ........ F21V 17/02; F21V 21/14; F21V 21/403; F21V 21/26-29; F21W 2131/205; F21S 8/065

See application file for complete search history.

(56) References Cited

U.S. PATENT DOCUMENTS

| | | | | |
|---|---|---|---|---|
| 3,003,737 A * | 10/1961 | Mehr | F21V 21/22 | 248/592 |
| 6,416,207 B1 * | 7/2002 | Chang | F21V 21/26 | 362/418 |

* cited by examiner

*Primary Examiner* — Julie A Bannan
(74) *Attorney, Agent, or Firm* — Alston & Bird LLP

(57) ABSTRACT

A lamp body bracket for supporting a lamp body includes a main support frame (10), opposite sides of the main support frame (10) are respectively provided with a first side extension portion (101) and a second side extension portion (102), and the first side extension portion (101)) and the second side extension portion (102) are arranged at intervals; a first adjusting seat (20), movably connected to the first side extension (101); the first adjusting seat (20) is arranged opposite to the second side extension (102), the first adjusting seat (20) is configured to connect a first end of the lamp body, and the second side extension (102) is configured to connect a second end of the lamp body opposite to the first end; the first adjusting seat (20) moves toward or away from the second side extension (102).

16 Claims, 9 Drawing Sheets

LAMP BODY BRACKET AND LIGHTING DEVICE

CROSS-REFERENCE TO RELATED APPLICATIONS

The present application claims priority to and the benefit of Chinese Patent Application No. 202122374535.3, which was filed at the China National Intellectual Property Administration on Sep. 28, 2021; the entire contents of which as are hereby incorporated by reference into the present disclosure.

BACKGROUND

Technical Field

The present application relates to the technical field of lighting equipment, and more specifically, relates to a lamp body bracket and a lighting device.

Description of Related Art

In the field of portable lighting devices, there are lighting devices that can flexibly adjust the degree of freedom of the lamp body relative to the bracket. For example, in the creation process of video works or other photographic works, lighting fixtures need to be able to be flexibly switch between multiple degrees of freedom to meet the lighting requirements of the photography scene.

In the existing technology, the lamp body of the on-site lighting lamp is mostly supported by a U-shaped bracket, and in use, the U-shaped opening of the U-shaped bracket faces downward. The structural parts on both sides of the light-emitting surface of the lamp body are respectively connected to the two ends of the U-shaped bracket, and are generally assembled through assembly holes defined at the ends, and the lamp body is supported between the two ends, and the arc-shaped bottom of the U-shaped bracket is rotatably connected to any pre-installation position.

Because the brackets are mostly made of rigid metal or alloy materials, and are fitted with assembly holes, the linear distance between the two ends of the U-shaped bracket is always kept unchanged. This puts forward higher requirements for the manufacturing accuracy of the pair of lamp bodies and their matching accuracy with the bracket. If there are manufacturing errors or assembly errors, such as structural deformation caused by temperature effects, it is easy to cause the lamp body to fail to be fitted to the bracket or to jam after being fitted to the bracket.

BRIEF SUMMARY

The purpose of the embodiments of the present application is to provide a lamp body bracket and a lighting device, which can allow the lamp body with manufacturing errors or assembly errors to be installed smoothly without jamming.

In order to achieve the above objective, the technical solution adopted in the present application is: to provide a lamp body bracket for supporting the lamp body, and the lamp body bracket includes: a main support frame, opposite sides of the main support frame are respectively provided with a first side extension portion and a second side extension portion, and the first side extension portion and the second side extension portion are arranged at intervals; a first adjusting seat, movably connected to the first side extension; the first adjusting seat is arranged opposite to the second side extension, the first adjusting seat is configured to connect a first end of the lamp body, and the second side extension is configured to connect a second end of the lamp body opposite to the first end; the first adjusting seat moves toward or away from the second side extension.

In an embodiment, one of the shaft assembly and the hole structure is provided with a first limiting portion, and the other one is provided with a second limiting portion, the first limiting portion and the second limiting portion protrude from a peripheral wall of the shaft assembly or the hole structure, the first limiting portion and the second limiting portion are both located on the sliding path of the shaft assembly to resist and limit the sliding stroke of the shaft assembly.

In an embodiment, a fixing block is provided on the first side extension portion, and the fixing block defines the hole structure, and the first adjusting seat defines the connecting structure inside; the peripheral wall of the hole structure close to the first adjusting seat is provided with the first limiting portion, and the peripheral wall of the shaft assembly is provided with the second limiting section.

In an embodiment, the shaft assembly includes a shaft core and a shaft sleeve sleeved on the shaft core, and the connection structure is configured in a threaded hole of the first adjusting seat, one end of the shaft core facing toward the first adjusting seat is threadedly connected to the threaded hole, and one end of the shaft core facing away from the first adjusting seat abuts against one end of the shaft sleeve.

In an embodiment, the shaft assembly further includes a first needle roller bearing, the first needle roller bearing is sleeved on the shaft sleeve and is located inside the hole structure; the second limiting portion is an end surface of the first needle roller bearing facing toward the first adjusting seat or a limiting protrusion protruding from the shaft sleeve.

In an embodiment, the lamp body bracket further includes a second adjusting seat; the second adjusting seat is movably connected to the second side extension portion and arranged opposite to the first adjusting seat, and the second adjusting seat is configured to connect the second end of the lamp body; the second adjusting seat rotates around a direction perpendicular to the second side extension portion to adjust a pitching angle of the lamp body relative to the main support frame.

In an embodiment, the lamp body bracket further includes an adjusting housing and a pitching drive assembly, and the adjusting housing is connected to the second side extension portion; the pitching drive assembly includes a first driving member, a first worm, a first worm gear and an adjusting shaft, the first worm gear and the first worms mesh with each other and are all arranged inside the adjusting housing; the first driving member is movably connected to the first worm, and one end of the adjusting shaft is inside the adjustment housing and is movably connected to the first worm gear, and the other end is outside the adjustment housing and is movably connected to the second adjustment seat.

In an embodiment, the main support frame further includes a mounting member, and the mounting member includes a mounting housing arranged between the first side extension portion and the second side extension portion and a mounting shaft fixedly connected to the mounting housing, the mounting shaft is perpendicular to a connecting line direction of the first adjusting seat and the second adjusting seat; the lamp body bracket further includes a rotary drive assembly for driving the mounting shaft to rotate, and the rotary drive assembly includes a second driving member, an adapter shaft, a flexible shaft, a second worm and a second worm gear, the adapter shaft is inside the adjusting housing, and the flexible shaft is inside the main support frame, the second worm and the second worm gear are inside the mounting housing; the second driving member, the adapter shaft, the flexible shaft, the second worm, the second worm gear, and the mounting shaft are movably connected in order; the first driving member and the second driving member each includes at least one of an adjusting knob and a driving motor.

In an embodiment, both ends of the first worm and both ends of the second worm are sleeved with bearing assemblies.

In an embodiment, the bearing assembly includes a second needle roller bearing and a planar thrust bearing arranged adjacently; inner walls of the adjusting housing and the mounting housing define a pair of mounting grooves, and the second needle bearing is accommodated in the corresponding mounting groove, the planar thrust bearing is arranged on the outer edge of the mounting groove.

In an embodiment, the main support frame includes a first support and a second support, and the first support and the second support extend into the inside of the mounting housing respectively by two opposite sides of the mounting housing, and the flexible shaft extends inside the second support; the first side extension portion is located at an end of the first support away from the mounting housing, and the second side extension portion is located at an end of the second support away from the mounting housing; a protruding structure is provided on the inner wall of the mounting housing, and the first support is provided with an escape space recessed inward along the radial direction thereof and a lug structure located on one side of the escape space, the first support is crimped to the protruding structure through the escape space, and the lug structure is adapted on the top surface of the protruding structure.

In one embodiment, the lamp body bracket further includes a shaft assembly; one of the first side extension portion and the first adjusting seat defines a hole structure, the other one defines a connecting structure, and one shaft end of the shaft assembly is movably inserted into the hole structure and slides along the axial direction of the hole structure, and the other shaft end of the shaft assembly is fixedly connected to the connecting structure.

The present application also proposes a lighting device, including: the lamp body bracket as described in any of the above embodiments; and a lamp body, the lamp body has a first end and a second end separately arranged on both sides of its light-emitting surface, the first adjusting seat in the lamp body bracket is connected to the first end, and the second side extension portion is connected to the second end.

The beneficial effects of the lamp body bracket provided by the present application are:

Compared with the existing technology, the lamp body bracket provided by the present application includes a main support frame and a first adjusting seat. Since the first adjusting seat can move toward or away from the second side extension portion, there is a gap between the first adjusting seat and the second side extension portion. The distance is adjustable, which reduces the manufacturing accuracy of the lamp body and its assembly accuracy with the bracket. Even if there are manufacturing errors or assembly errors, such as structural deformation due to temperature effects, it is easy to fit the lamp body to the bracket. And it will not be stuck after being fitted to the bracket.

Compared with the exiting technology, the lighting device provided by the present application has the same beneficial effects as the lamp body bracket provided by the present application.

BRIEF DESCRIPTION OF THE FIGURES

In order to more clearly describe the technical solutions in the embodiments of the present application, the following will briefly introduce the drawings needed in the description of the embodiments or the existing technology. Obviously, the drawings in the following description are only some embodiments of the present application. For those of ordinary skill in the art can obtain other drawings based on these drawings without creative labor.

The reference signs in the figures are as following.

Figure 1:
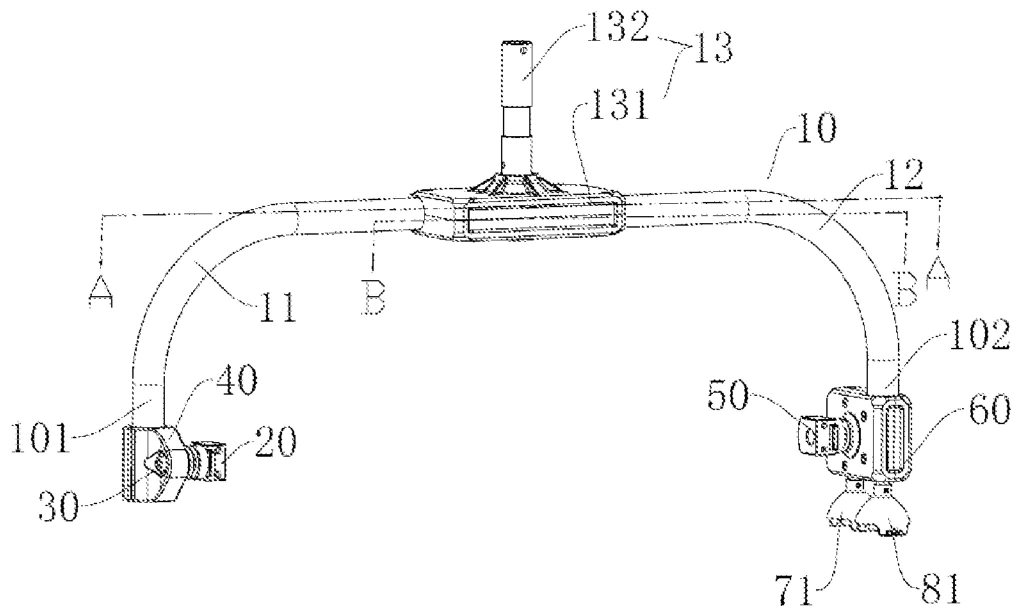
FIG. 1 is a schematic structural diagram of a lamp body bracket provided by an embodiment of the application.

10. main support frame; 101, first side extension portion; 102, second side extension portion; 11, first support; 111, escape space; 112, lug structure; 12, second support; 13, mounting member; 131, mounting housing; 132, mounting shaft; 1311, protruding structure; 20, first adjusting seat; 30, shaft assembly; 31, shaft core; 32, shaft sleeve; 33, first needle roller bearing; a, hole structure; b, connecting structure; c, first limiting portion; d, second limiting portion; 40, fixing block; 50, second adjusting seat; 60, adjusting housing; 70, pitching drive assembly; 71, first driving member; 72, first worm; 73, first worm gear; 74, Adjusting shaft; 80, rotary drive assembly; 81, second driving member; 82, adapter shaft; 83, flexible shaft; 84, second worm; 85, second worm gear; 100, second needle roller bearing; 110, planar thrust bearing; 120, mounting groove; 130, press block.

DETAILED DESCRIPTION OF VARIOUS EMBODIMENTS

In order to make the technical problem to be solved by the present application, technical solution, and beneficial effects clearer, the following further describes the present application in detail with reference to the accompanying drawings and embodiments. It should be understood that the specific embodiments described here are only used to explain the present application, and are not used to limit the present application.

It should be noted that when an element is referred to as being “fixed to” or “arranged on” another element, it is directly on the other element or indirectly on the other element. When an element is said to be “connected to” another element, it is directly connected to the other element or indirectly connected to the other element.

It should be understood that the terms “length”, “width”, “upper”, “lower”, “front”, “rear”, “left”, “right”, “vertical”, “horizontal”, “top”, “bottom”, “inner”, “outer”, etc. indicate the position or positional relationship based on the position or positional relationship shown in the drawings, and are only for the convenience of describing the application and simplifying the description, rather than indicating or implying the device or element must have a specific orientation, be constructed and operated in a specific orientation, and therefore cannot be construed as a limitation of the present application.

In addition, the terms of “first” and “second” are only used for descriptive purposes, and cannot be understood as indicating or implying relative importance or implicitly indicating the number of indicated technical features. Thus, the features defined with “first” and “second” may explicitly or implicitly include one or more of these features. In the description of the present application, “a plurality of” means two or more than two, unless otherwise specifically defined.

The lamp body bracket and the lighting device provided by the embodiments of the present application will now be described.

The lamp body bracket provided by the embodiment of the present application is used to support the lamp body. Referring to FIG. 1, the lamp body bracket includes a main support frame 10 and a first adjusting seat 20 on the main support frame 10.

A first side extension portion 101 and a second side extension portion 102 are respectively provided on opposite sides of the main support frame 10, and the first side extension portion 101 and the second side extension portion 102 are arranged at intervals. In one embodiment, the main support frame 10 is roughly U-shaped. It is understood that the main support frame 10 may also have other shapes, such as V-shaped, semi-circular, etc.

In one embodiment, the main support frame includes a first support 11 and a second support 12 which are arranged oppositely, the first side extension portion 101 is an end of the first support 11, the second side extension portion 102 is an end of the second support 12, and the first support 11 is far away from the first side extension. The other end of the portion 101 is connected to the other end of the second support 12 away from the second side extension portion 102. It is understood that the first support 11 and the second support 12 may be an integral structure or a split structure.

In one embodiment, the main support frame 10 further includes a mounting member 13 connected between the first support 11 and the second support 12. Optionally, the mounting member 13, the first support 11, and the second support 12 are split and connected structures; it is understandable that mounting member 13 can also be integrated with one or both of the first support 11 and the second support 12, for example, the mounting member 13 and the first Support 11 is integrally formed, and the mounting member 13 is the end of first support 11 at this time. In other embodiments, the mounting member 13 can also be omitted, and in this case, the first support 11 and the second support 12 are directly connected.

Optionally, the mounting member 13 is used to fix the lamp body bracket at a preset position, so as to install the lamp body at the preset position. It is understood that the lamp body bracket can also be fixed in a preset position by other pre-installed parts installed on the first support 11 or the second support 12.

The first adjusting seat 20 is movably connected to the first side extension portion 101, the first adjusting seat 20 is arranged opposite to the second side extension portion 102, the first adjusting seat 20 is used to connect the first end of the lamp body, and the second side extension portion is used to connect the second end of the lamp body opposite to the first end. The first adjusting seat 20 can move toward or away from the second side extension portion 102 to adjust the distance between the first adjusting seat 20 and the second side extension portion 102.

In the lamp body bracket provided by the embodiment of the present application, since the first adjusting seat 20 can move toward or away from the second side extension portion 102, the distance between the first adjusting seat 20 and the second side extension portion 102 is adjustable, that is, the lamp body is between the first support 11 and the second side extension portion 102. The pre-installation space between the second support 12 is variable, which reduces the manufacturing accuracy of the lamp body and its assembly accuracy with the bracket. Even if there are manufacturing errors or assembly errors, such as structural deformation due to temperature effects, it is easy to fit the lamp body to the bracket, and it will not be stuck after being fitted to the lamp body bracket.

Figure 2:
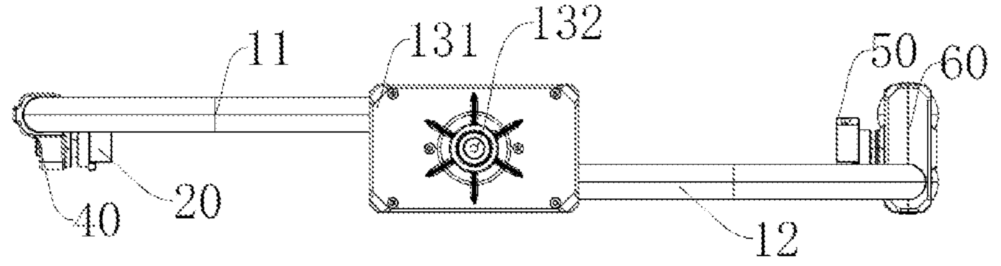
FIG. 2 is a top view of the lamp body bracket shown in FIG. 1.
Figure 3:
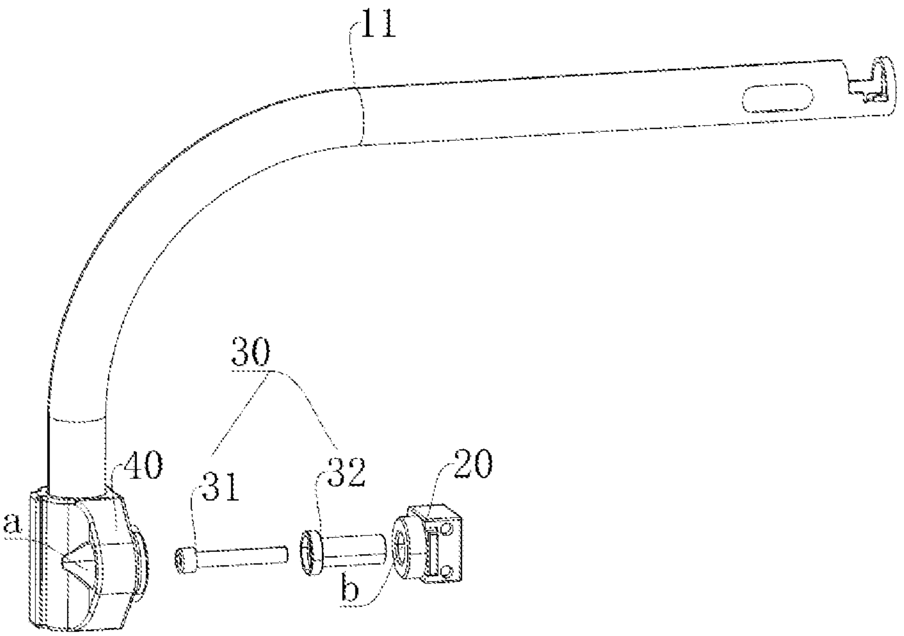
FIG. 3 is a three-dimensional exploded schematic diagram of the first support, first adjusting seat, and shaft assembly in the lamp body bracket shown in FIG. 1.

Referring to FIGS. 1-3, in one embodiment, the lamp body bracket further includes a shaft assembly 30; one of the first side extension portion 101 and the first adjusting seat 20 is provided with a hole structure, and the other one is provided with a connecting structure b and one end of the shaft assembly 30 is movably inserted into the hole structure a and can slide along the axis of the hole structure a, and the other end is fixedly connected to the connecting structure.

In this embodiment, the first adjusting seat 20 and the first side extension portion 101 are slidingly connected by the shaft assembly 30. Since the shaft assembly 30 slides along the axis of the hole structure, it is possible to avoid the deviation during the sliding process.

In one embodiment, the first side extension portion 101 is provided with a hole structure a, and the first adjusting seat 20 is provided with a connecting structure b. Alternatively, the first adjusting seat 20 is provided with a hole structure a, and the second side extension portion 102 is provided with a connecting structure b.

Among them, the hole structure a is a through hole structure or a blind hole structure, and the connecting structure b is a thread connecting structure, a pin hole and a pin matching connecting structure, or an interference fit connecting structure, etc.

In other embodiments, the first adjusting seat 20 and the first side extension portion 101 may also be elastically connected by an elastic member or slidingly connected by a sliding rail assembly, thereby adjusting the distance between the first adjusting seat 20 and the second side extension portion 102.

Figure 4:
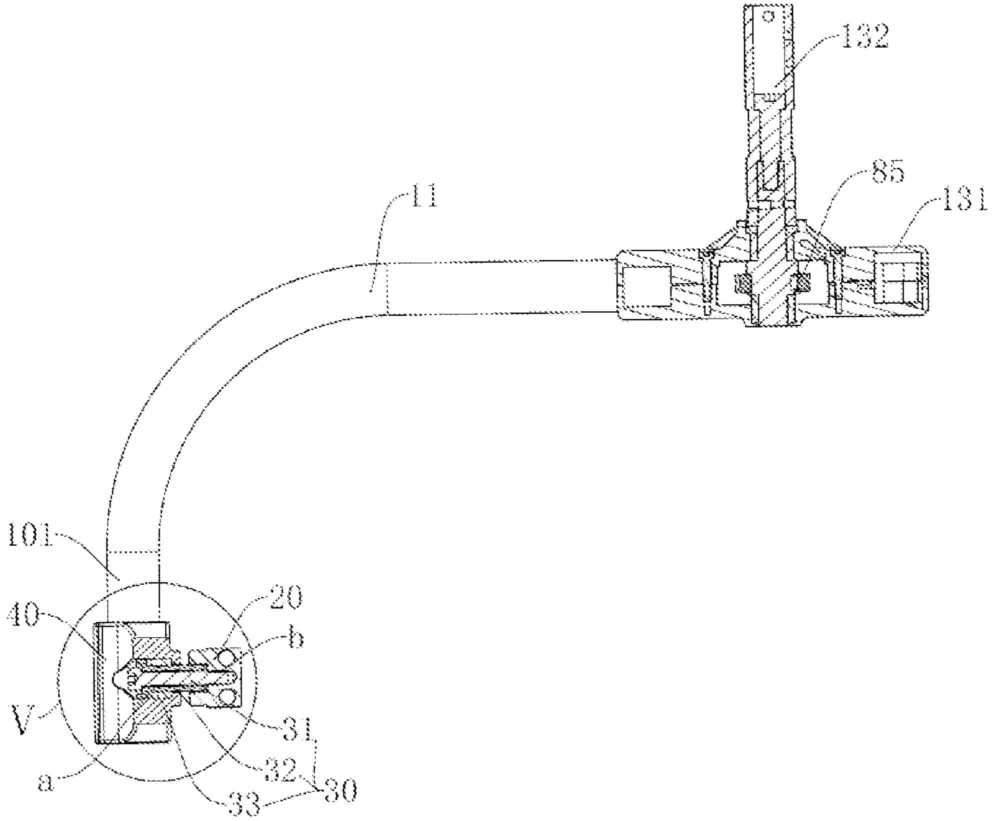
FIG. 4 is a cross-sectional view of the lamp body bracket shown in FIG. 1 along the A-A direction.
Figure 5:
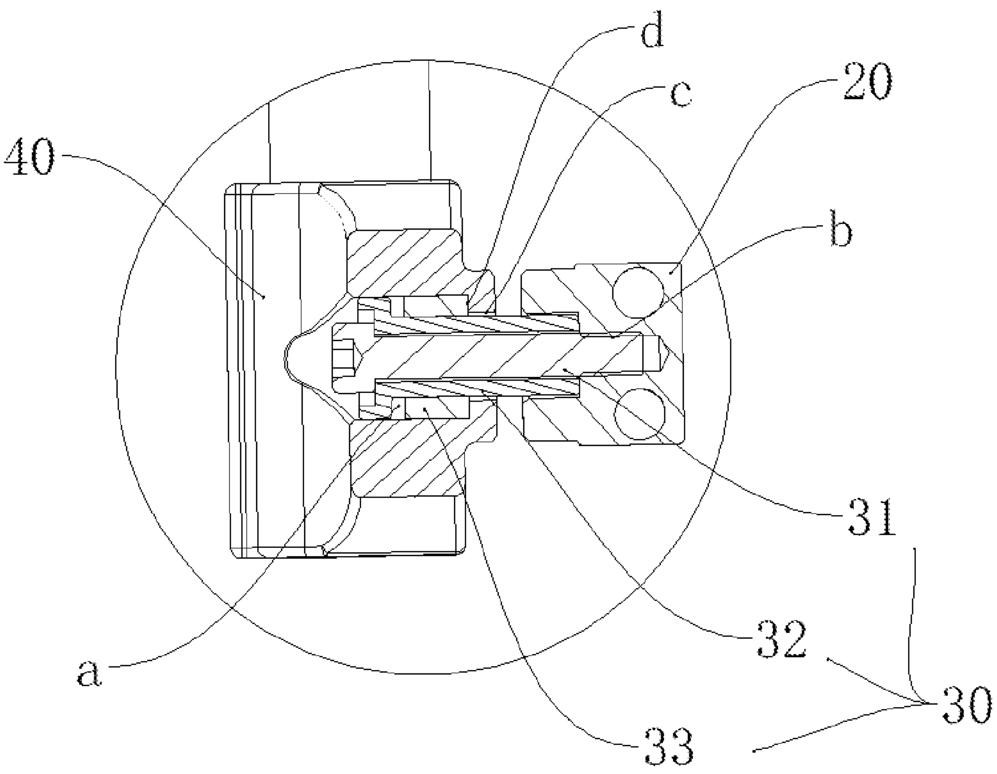
FIG. 5 is an enlarged view of part V in FIG. 4.

Referring to FIGS. 4 and 5 at the same time, in one embodiment, one of the shaft assembly 30 and the hole structure is provided with a first limiting portion c, and the other is provided with a second limiting portion d, and the first limiting portion c and the second limiting portion d protrude from the shaft. The peripheral wall, the first limiting portion c and the second limiting portion of the assembly 30 or the hole structure are all located on the sliding path of the shaft assembly 30 to offset and limit the sliding stroke of the shaft assembly 30, and can prevent the first adjusting seat 20 from being separated from the first side extension portion 101.

In one embodiment, the first side extension portion 101 is provided with a fixing block 40, and the hole structure a is arranged on the fixing block 40, the peripheral wall of the hole structure a next to the first adjusting seat 20 is provided with a first limiting portion c, and the peripheral wall of the shaft assembly 30 is provided with a second limiting portion d; the connecting structure b is arranged in the threaded hole in the first adjusting seat 20.

By arranging the fixing block 40, it is convenient to define the hole structure a in the first side extension portion 101. The first adjusting seat 20 can move toward the direction close to the second side extension portion 102 until the first limiting portion c and the second limiting portion d. The first adjusting seat 20 can move away from the second side extension portion 102 until the first adjusting seat 20 and the fixing block 40 abut.

It is understood that, in other embodiments, there may be one first limiting portion c and two second limiting portions, so that the first limiting portion c is moved between two second limiting portions to limit the stroke range of the shaft assembly 30.

As shown in FIG. 3, in an embodiment, the shaft assembly 30 includes a shaft core 31 and a shaft sleeve 32 sleeved on the shaft core 31, the connecting structure b is a threaded hole arranged in the first adjusting seat 20, and one end screw of the shaft core 31 facing toward the axis of the first adjusting seat 20 is connected to the threaded hole, and the end of the shaft core 31 facing away from the first adjusting seat 20 abuts against the end of the shaft sleeve 32.

Among them, the end of the shaft sleeve 32 far away from the first adjusting seat 20 may be provided with a protrusion, which plays a role of limiting. The shaft core 31 and the shaft sleeve 32 can move synchronously in the hole structure a; since the end of the shaft core 31 away from the first adjusting seat 20 abuts against the end of the shaft sleeve 32, the relative position of the shaft core 31 and the shaft sleeve 32 is restricted.

In one embodiment, the shaft assembly 30 further includes a first needle roller bearing 33, and the first needle roller bearing 33 is sleeved on the shaft sleeve 32 and located in the hole structure a.

As shown in FIG. 5, in one embodiment, the first limiting portion c is the limiting protrusion opened on the hole structure a, the second limiting portion d is the end surface of the first needle roller bearing 33 facing the first adjusting seat 20, and the end surface of the first needle roller bearing 33 is connected to the end surface of the first adjusting seat 20. The first limiting portion c is offset to limit the stroke of the shaft assembly 30; or, in another embodiment, the second limiting portion is a limiting protrusion protruding on the shaft sleeve 32, and at this time, the second limiting portion is provided on the first needle roller bearing 33 next to one side of seat 20. It is understood that the first needle roller bearing 33 is omitted. In this case, the second limiting portion is a limiting protrusion and protruded on the end of the shaft sleeve 32 away from the first adjusting seat 20.

In the above embodiment, by arranging the first needle roller bearing 33, the shaft assembly 30 can slide smoothly in the hole structure a, thereby adjusting the distance between the first adjusting seat 20 and the second side extension portion 102. In this embodiment, the first adjusting seat 20 can move relative to the second side extension portion 102, so as to compensate for the problem of poor assembly or failure of assembly caused by the bending of the main support frame 10.

In addition, the shaft assembly 30 is rotated within the hole structure a, so that the first adjusting seat 20 is rotated relative to the first side extension portion 101; the first needle roller bearing 33 can make the rotation smooth.

Figure 6:
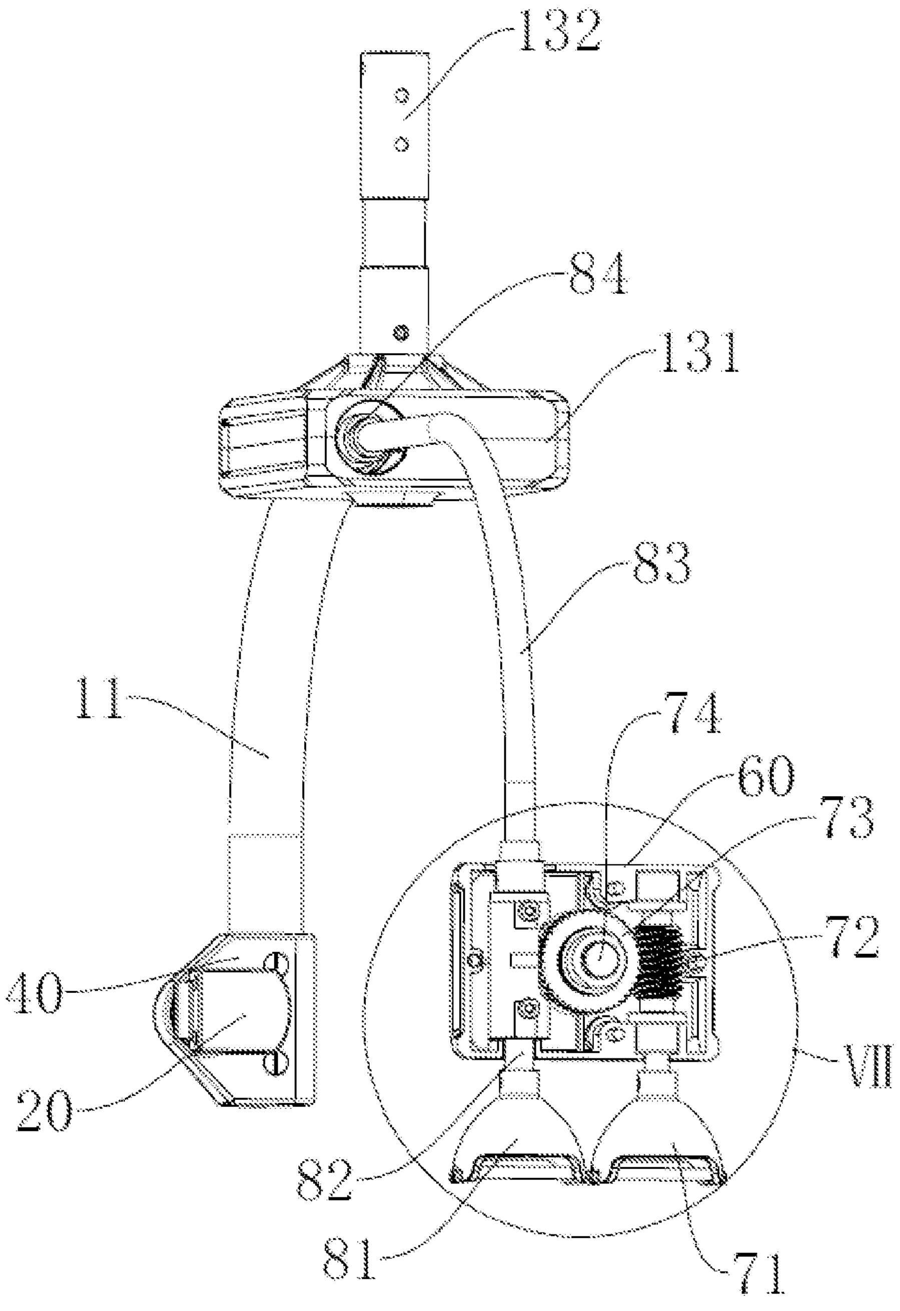
FIG. 6 is a schematic diagram of the lamp body bracket shown in FIG. 1 after part of the adjusting housing is removed.
Figure 7:
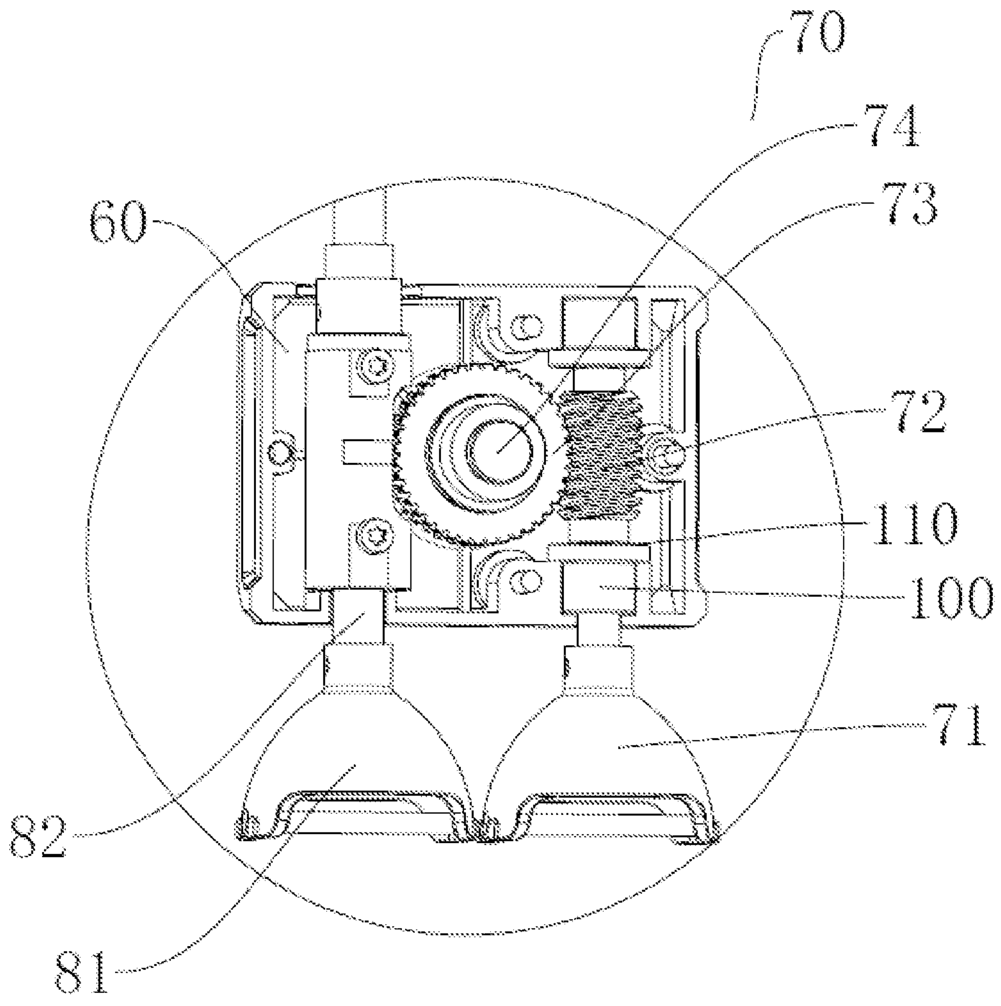
FIG. 7 is an enlarged view of part VII of the lamp body bracket shown in FIG. 6.

Referring to FIG. 1, FIG. 6, FIG. 7, in one embodiment, the lamp body bracket further includes a second adjusting seat 50; the second end of the body; the second adjusting seat 50 can rotate around the direction perpendicular to the second side extension portion 102 to adjust the pitching angle of the lamp body relative to the main support frame 10.

Optionally, the first adjusting seat 20 and the second adjusting seat 50 are aligned, and the rotation axis of the second adjusting seat 50 is parallel to the connecting line direction of the first adjusting seat 20 and the second adjusting seat 50.

It is understood that the centers of the first adjusting seat 20 and the second adjusting seat 50 may also be arranged non-aligned, and the rotation axis of the second adjusting seat 20 may be perpendicular to the extension direction of the second side extension portion 102. Optionally, both the first adjusting seat 20 and the second adjusting seat 50 are provided with the connecting holes for connecting the lamp body.

Optionally, the first adjusting seat 20 is located inside the first support 11, the second adjusting seat 50 is located inside the second support 12, and the lamp is fixed between the first support 11 and the second support 12.

In this embodiment, the position of the lamp body in the connecting line direction of the first adjusting seat 20 and the second adjusting seat 50 is adjusted by the first adjusting seat 20, and the first adjusting seat 20 is rotated relative to the hole structure a through the shaft assembly 30, so the first adjusting seat 20 does not restrict the lamp body to rotate around the above-mentioned line as a central axis. The second adjusting seat 50 drives the lamp body to rotate with the above-mentioned connection line as the central axis, and the position of the second adjusting seat 50 in the above-mentioned connecting line direction remains unchanged, so the second adjusting seat 50 can restrict the lamp body in the above-mentioned connecting line direction, thus the pitching angle of the lamp body is adjusted by rotating the second adjusting seat 50.

In one embodiment, the lamp body bracket further includes an adjusting housing 60 and a pitching drive assembly 70, and the adjusting housing 60 is connected to the second side extension portion 102.

The pitching drive assembly 70 includes a first driving member 71, a first worm 72, a first worm gear 73, and an adjusting shaft 74. The first worm gear 73 and the first worm 72 are meshed with each other and are both arranged inside the adjusting housing 60; the driving member 71 is movably connected to the first worm 72, one shaft end of the adjusting shaft 74 is located inside the adjusting housing 60 and is drivingly connected to the first worm gear 73, and the other shaft end is located outside the adjusting housing 60 and is drivingly connected to the second adjusting seat 50.

In this embodiment, the axes of the first driving member 71 and the first worm 72 are perpendicular to the connection line between the first adjusting seat and the second adjusting seat 50, and the axes of the adjusting shaft 74 and the first worm gear 73 overlap with the connection line mentioned above. Therefore, the first driving member 71 is able to drive the first worm 72 to rotate, the first worm 72 drives the first worm gear 73 to rotate, the first worm gear 73 drives the adjusting shaft 74 to rotate, and then drives the second adjusting seat 50 to rotate around the connecting line direction of the first adjusting seat 20 and the second adjusting seat 50.

As shown in FIG. 7, the first driving member 71 includes an adjusting knob. The operating end of the first driving member 71 is located outside of the adjusting housing 60. The transmission end of the first driving member 71 opposite to the operating end can extend to the inside of the adjusting housing 60 and is connected to the first worm 72. The first driving member 71 is moved to adjust the pitching angle of the lamp body relative to the main support frame 10. It is understood that the first driving member 71 may also include a driving motor, so as to drive the second adjusting seat 50 to rotate in an electric manner; or, the first driving member 71 may include a driving motor and a knob at the same time to realize a manual and electric dual control mode.

As shown in FIG. 1, in an embodiment, the mounting member 13 includes a mounting housing 131 arranged between the first side extension portion 101 and the second side extension portion 102 and a mounting shaft 132 fixedly connected to the mounting housing 131, and the mounting shaft 132 is perpendicular to the connecting line direction of the first adjusting seat 20 and the second adjusting seat 50.

Figure 8:
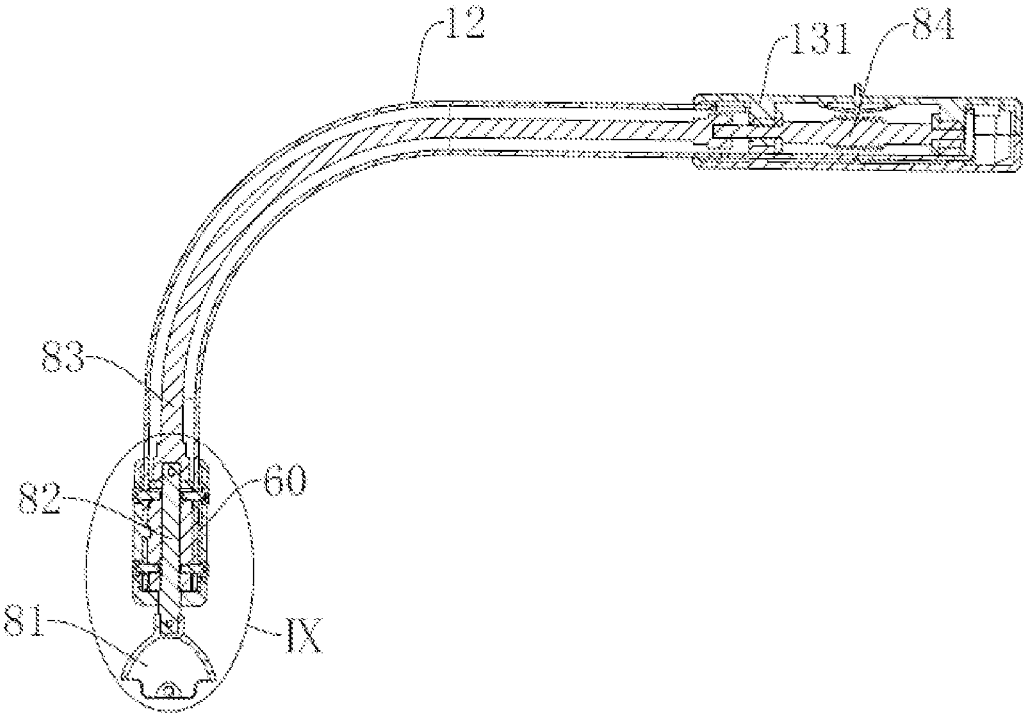
FIG. 8 is a cross-sectional view of the lamp body bracket shown in FIG. 1 along the B-B direction.
Figure 9:
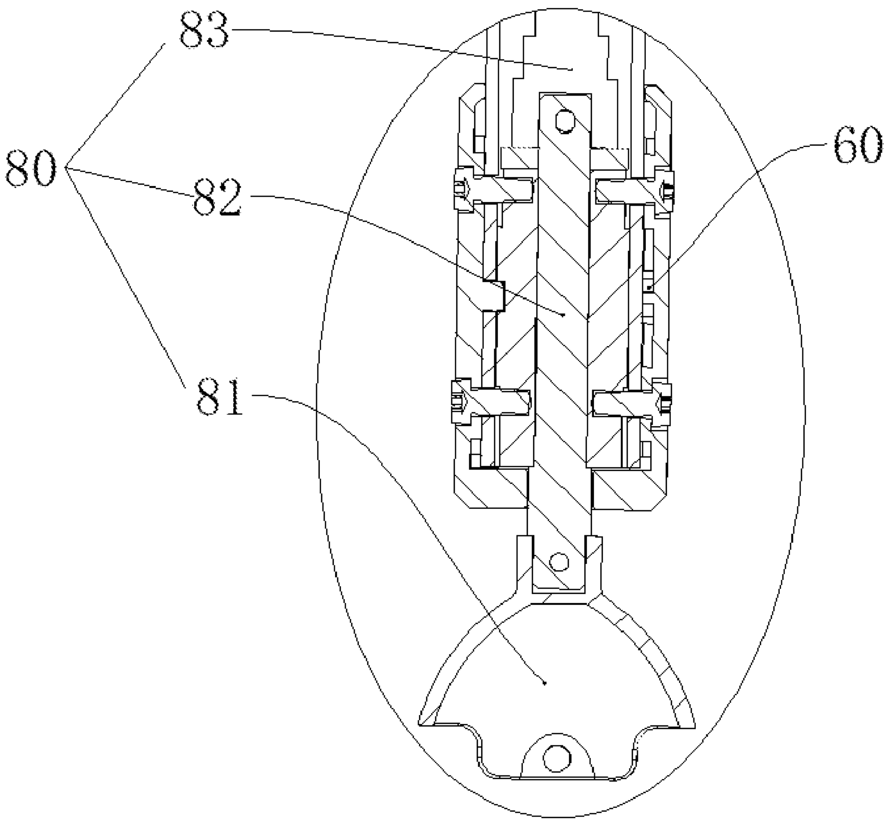
FIG. 9 is an enlarged view of part IX in FIG. 8.
Figure 10:
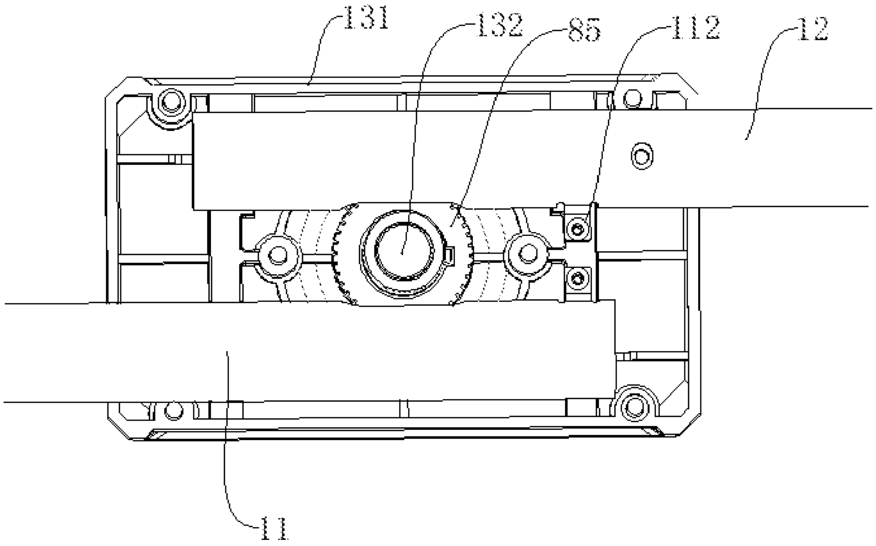
FIG. 10 is a schematic diagram of the structure in mounting housing after the sub-housing on the lower side of the mounting housing is omitted in FIG. 1.
Figure 11:
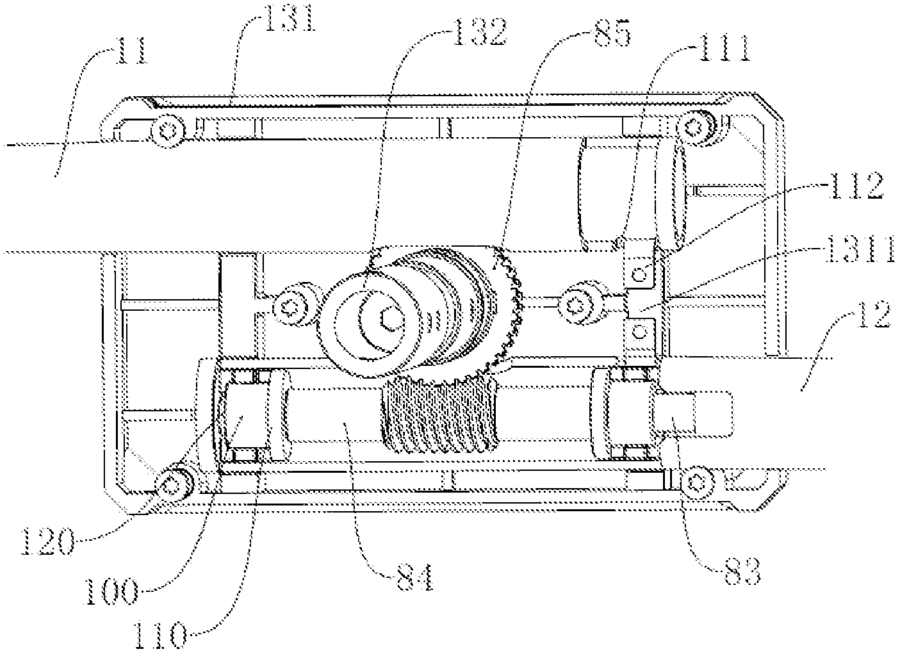
FIG. 11 is a schematic diagram of the structure in the mounting housing after the sub-housing on the upper side of the mounting housing is omitted in FIG. 1.
Figure 12:
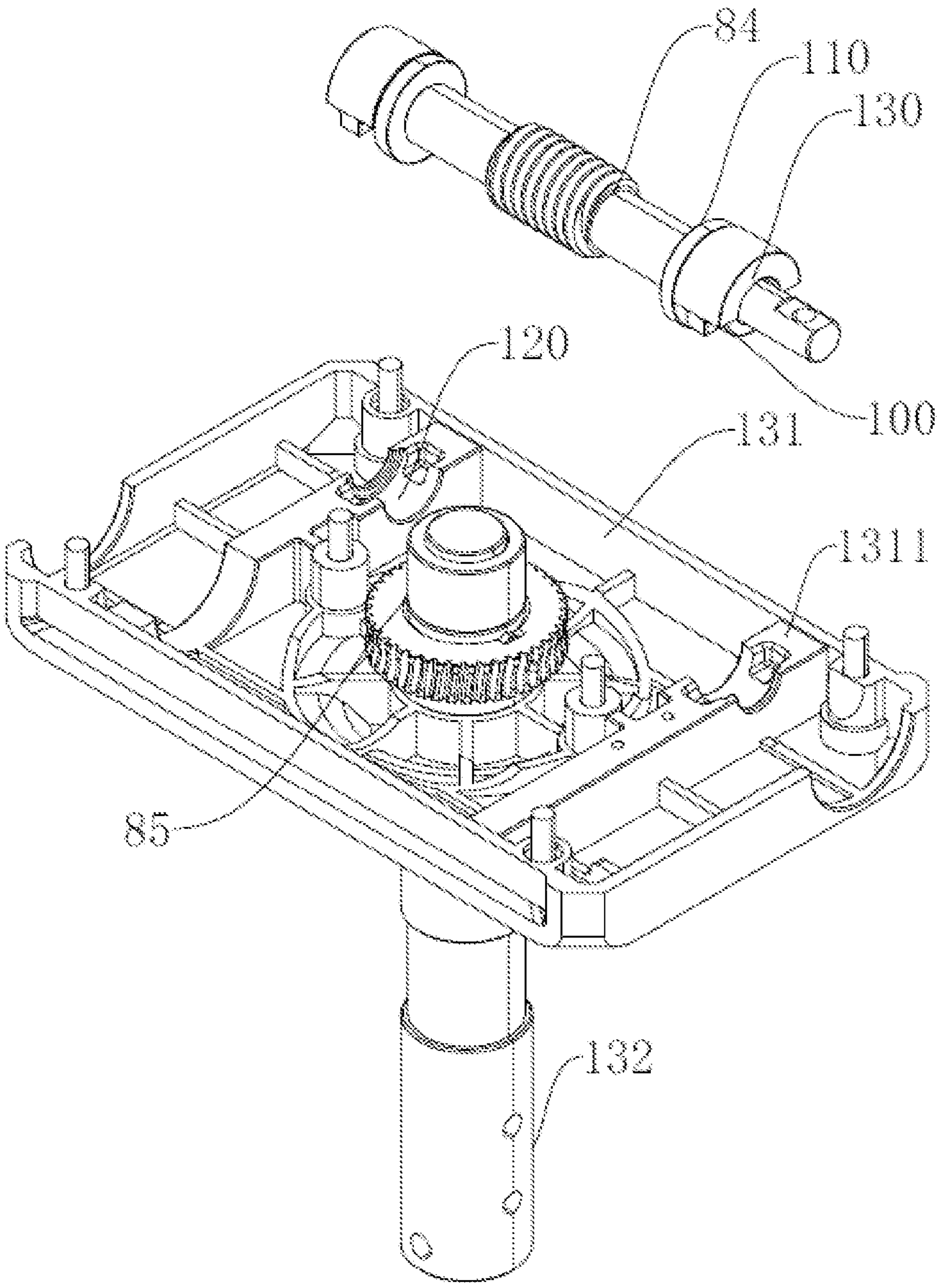
FIG. 12 is a three-dimensional exploded schematic diagram of the mounting housing and the second worm in FIG. 1.

Referring to FIGS. 1, 8, and 9, the lamp body bracket also includes a rotary drive assembly 80 for driving the mounting shaft 132 to rotate. The rotary drive assembly 80 includes a second driving member 81, an adapter shaft 82, a flexible shaft 83, a second worm 84 and a second worm gear 85, and an adapter shaft 82 located in the adjusting housing 60, the flexible shaft 83 is located in the main support frame 10, the second worm 84 and the second worm gear 85 are located in the mounting housing 131 and are meshed with each other; the second driving member 81, the adapter shaft 82, the flexible shaft 83, the second worm 84, the second worm gear 85 and the mounting shaft 132 are connected in order.

The second driving member 81 includes at least one of an adjusting knob and a driving motor. In this embodiment, the second driving member 81 includes an adjusting knob, the operating end of the second driving member 81 is located outside the adjusting housing 60, and the transmission end of the second driving member 81 opposite to the operating end can extend to the inside of the adjusting housing 60 and connected to the adapter shaft 82, and the operator rotates the second driving member 81 can drive the adapter shaft 82 and the flexible shaft 83 to rotate, and then drive the second worm 84 and the second worm gear 85 to rotate, so that the mounting shaft 132 rotates with the second worm gear 85.

In this embodiment, the axes of the second driving member 81 and the adapter shaft 82 are perpendicular to the line between the first adjusting seat 20 and the second adjusting seat 50, the second worm 84 is parallel to the connecting line, and the axes of the second worm gear 85 and the mounting shaft 132 are perpendicular to the connecting line.

Inside the adjusting housing 60, the adapter shaft 82 is parallel to the first worm 72, and the first worm gear 73 is arranged in the area between the adapter shaft 82 and the first worm 72, making the interior of the adjusting housing 60 compact. Since the mounting shaft 132 and the main support frame 10 are fixedly connected by the mounting housing 131, and the other shaft end of the mounting shaft 132 is rotatably connected to a preset position, the adjusting shaft 74 can drive the main support frame 10 to rotate by adjusting the mounting housing 131.

Due to the large weight and volume of the existing lamp body, the main support frame 10 is adjusted by the combination of the knob structure and the worm gear, the transmission process is stable and the transmission is relatively large, and it is not easy to drive difficultly or jam.

Referring to FIGS. 7 and 10-12, in one embodiment, both ends of the first worm 72 and the second worm 84 are sheathed with bearing assemblies. The bearing assembly can make the first worm 72 and second worm 84 slide smoothly in the corresponding shell, stable and smooth, and not easy to jam.

In one embodiment, the bearing assembly includes a second needle roller bearing 100 and a planar thrust bearing 110 that are adjacently arranged; a pair of mounting grooves 120 are formed on the inner walls of the adjusting housing 60 and the mounting housing 131, and the second needle roller bearing 100 is accommodated in the corresponding mounting groove. The thrust bearing 110 is located on the outer edge of the mounting groove.

The mounting groove 120 has a groove inner surface and a groove outer surface. The inner surface of the groove is an arc surface, and the outer surface of the groove is perpendicular to the axial direction of the first worm 72 or the second worm 84; the second needle roller bearing 100 is adapted to the inner surface of the groove, and the planar thrust bearing 110 is adapted to the outer surface of the groove. Among them, the planar thrust bearing 110 bears the axial force of the worm, and the second needle roller bearing 100 bears the radial force of the worm, so the transmission stability of the worm gear is further ensured.

In the adjusting housing 60, a pressing block 130 is arranged on the top of the second needle roller bearing 100. The pressing block 130 has an arc-shaped mouth adapted to the outer periphery of the second needle roller bearing 100. The arc-shaped mouth and the mounting groove 120 are combined to compress the second needle roller bearing 100.

The lamp body bracket provided by the embodiment of the application can control the flexible shaft 83 to drive the mounting shaft 85 to rotate through the second driving member 81, that is, realizing the rotation of the lamp body in the horizontal direction, and the pitching angle of the lamp body is controlled by the first driving member 71; the above-mentioned lamp body bracket is driven by a worm gear mechanism. Since the two ends of the first worm 72 and the second worm 84 are equipped with corresponding bearing assemblies, the movement of each transmission part can be more stable and smooth, and the occurrence of jamming can be effectively reduced. It reduces the jamming phenomenon during the adjustment process, and the operation is smoother. It can be understood that the bearing assembly may also include only needle roller bearings or plane pressure bearings, or include other types of bearings.

Among them, the adjusting housing 60 and the mounting housing 131 are formed by splicing two sub-shells. Specifically, each sub-shell is stretched with an inner concave space, and the two sub-shells are butted to make the two inner concave spaces merge, and the two sub-shells are relatively fixed by piercing the two sub-shells by a bolt with a certain length.

In one embodiment, the main support frame 10 includes an arc-shaped first support 11 and a second support 12. The first support 11 and the second support 12 respectively extend into the mounting housing 131 from two opposite sides of the mounting housing 131, and the flexible shaft 83 extends inside the second support 12; The first side extension portion 101 is located at the end of the first support 11 away from the mounting housing 131, and the second side extension portion is located at the end of the second support 12 away from the mounting housing 131.

Both the first support 11 and the second support 12 may be tubular, but are not limited thereto, for example, are rod-shaped.

In the mounting housing 131, the section of the first support 11 located inside the mounting housing 131 is parallel to the second worm 84, and the second worm gear 85 is arranged between the section and the second worm 84.

The section of the second support 12 located inside the mounting housing 131 is also parallel to the second worm 84. The sections of the first support 11 and the second support 12 inside the mounting housing 131 are located on opposite sides of the second worm 84. Therefore, the extension directions of the first support 11 and the second support 12 inside the mounting housing 131 do not overlap. It is understood that, in other embodiments, the extension directions of the first support 11 and the second support 12 inside the mounting housing 131 may overlap.

In one embodiment, the inner wall of the mounting housing 131 is provided with a protruding structure 1311, the first support 11 is provided with an escape space 111 recessed radially inwardly and a lug structure 112 on the side of the escape space 111, and the first support 11 is crimped to the protruding structure 1311 through the escape space 111, the lug structure 112 is adapted to the top surface of protruding structure 1311.

To facilitate assembly, the escape space 111 of the first support 11 is arranged on the protruding structure 1311 in advance, and then the lug structure 112 is fixed to the protruding structure 1311 with screws and other fasteners to achieve the pre-fixation of the first support 11, and then the two sub-shells is pressed to form the mounting housing 131 together, which greatly improves the assembly efficiency, and one operator can complete the fixed installation of the main support frame 10.

Specifically, two parallel protruding structures 1311 are arranged inside the mounting housing 131, and the section of the first support 11 located inside the mounting housing 131 and the second worm 84 are perpendicular to the length direction of the protruding structure 1311. A pair of mounting grooves 120 are respectively arranged on two protruding structures 1311, and a pair of mounting grooves 120 are arranged oppositely. One of the protruding structures 1311 also has a mounting groove spaced apart from the mounting groove 120. The first support 11 is located in the mounting housing 131 near the end of the section with the above-mentioned escape space 111. The escape space 111 is different from the other without mounting grooves. The protruding structure 1311 is crimped, and the section away from the end is clamped into the clamping groove.

It is understood that the second support 12 located at the end of the mounting housing 131 may also be provided with a position avoidance structure and a lug structure 112, which will not be repeated here.

The present application also provides a lighting device, which includes a lamp body bracket and a lamp body. The lamp body has a first end and a second end separately arranged on both sides of the light-emitting surface. The first adjusting seat 20 in the lamp body bracket is connected to the first end and the lamp. The second side extension portion 102 in the body bracket is connected to the second end.

The above-mentioned lighting device is installed and supported by the lamp body bracket, and the distance between the first adjusting seat 20 and the second side extension portion 102 is adjusted by moving the first adjusting seat 20, which is convenient to install, easy to assemble, and not easy to jam. Further, the lighting device can also adjust the pitching angle of the lamp body through the pitching drive assembly 70, and adjust the rotation angle of the lamp body in the horizontal plane through the rotary drive assembly 80, which can adapt to different lighting requirements.

The above descriptions are only preferred embodiments of the present application, and are not intended to limit the present application. Any modification, equivalent replacement and improvement made within the spirit and principle of the present application shall be within the protection of the present application.

What is claimed is:

1. A lamp body bracket for supporting a lamp body having a light-emitting surface, and a first end and a second end, which are opposite to each other and arranged on two sides of the light-emitting surface of the lamp body, respectively, the lamp body bracket comprising:

a main support frame, wherein opposite sides of the main support frame are respectively provided with a first side extension portion and a second side extension portion, and the first side extension portion and the second side extension portion are arranged at intervals;

a first adjusting seat, movably connected to the first side extension; and a shaft assembly;

wherein:

the first adjusting seat is arranged opposite to the second side extension, the first adjusting seat is configured to be in connection with the first end of the lamp body, and the second side extension is configured to be in connection with the second end of the lamp body, the first adjusting seat is configured to move toward or away from the second side extension, one of the first side extension portion and the first adjusting seat defines a hole structure, the other one defines a connecting structure, and one shaft end of the shaft assembly is movably inserted into the hole structure and slides along an axial direction of the hole structure, the other shaft end of the shaft assembly is fixedly connected to the connecting structure, and one of the shaft assembly and the hole structure is provided with a first limiting portion, and the other one is provided with a second limiting portion, the first limiting portion and the second limiting portion protrude from a peripheral wall of the shaft assembly or the hole structure, the first limiting portion and the second limiting portion are both located on a sliding path of the shaft assembly to resist and limit a sliding stroke of the shaft assembly.

2. The lamp body bracket according to claim 1, wherein:

a fixing block is provided on the first side extension portion, and the fixing block defines the hole structure, and the first adjusting seat defines the connecting structure inside; and the peripheral wall of the hole structure close to the first adjusting seat is provided with the first limiting portion, and the peripheral wall of the shaft assembly is provided with the second limiting section.

3. The lamp body bracket according to claim 2, wherein:

the shaft assembly comprises a shaft core and a shaft sleeve sleeved on the shaft core, and the connection structure is configured as a threaded hole defined in the first adjusting seat, one end of the shaft core facing toward the first adjusting seat is threadedly connected to the threaded hole, and one end of the shaft core facing away from the first adjusting seat abuts against one end of the shaft sleeve.

4. The lamp body bracket according to claim 3, wherein:

the shaft assembly further comprises a first needle roller bearing, the first needle roller bearing is sleeved on the shaft sleeve and is located inside the hole structure; and the second limiting portion is an end surface of the first needle roller bearing facing toward the first adjusting seat or a limiting protrusion protruding from the shaft sleeve.

5. The lamp body bracket according to claim 1, wherein:

the lamp body bracket further comprises a second adjusting seat; and the second adjusting seat is movably connected to the second side extension portion and arranged opposite to the first adjusting seat, and the second adjusting seat is configured to connect the second end of the lamp body; and the second adjusting seat is rotatable around a direction perpendicular to the second side extension portion to adjust a pitching angle of the lamp body relative to the main support frame.

6. The lamp body bracket according to claim 5, wherein:

the lamp body bracket further comprises an adjusting housing and a pitching drive assembly, and the adjusting housing is connected to the second side extension portion; and the pitching drive assembly comprises:

a first driving member, a first worm, a first worm gear, and an adjusting shaft;

wherein:

the first worm gear and the first worms mesh with each other and are all arranged inside the adjusting housing;

the first driving member is movably connected to the first worm, and one end of the adjusting shaft is inside the adjustment housing and is movably connected to the first worm gear, and the other end is outside the adjustment housing and is movably connected to the second adjustment seat.

7. The lamp body bracket according to claim 6, wherein:

the main support frame further comprises a mounting member, and the mounting member comprises a mounting housing arranged between the first side extension portion and the second side extension portion and a mounting shaft fixedly connected to the mounting housing, the mounting shaft is perpendicular to a connecting line direction of the first adjusting seat and the second adjusting seat;

the lamp body bracket further comprises a rotary drive assembly for driving the mounting shaft to rotate; the rotary drive assembly comprises: a second driving member, an adapter shaft, a flexible shaft, a second worm, and a second worm gear;

the adapter shaft is inside the adjusting housing, and the flexible shaft is inside the main support frame, the second worm and the second worm gear are inside the mounting housing;

the second driving member, the adapter shaft, the flexible shaft, the second worm, the second worm gear, and the mounting shaft are movably connected in order; and the first driving member and the second driving member each comprises at least one of an adjusting knob and a driving motor.

8. The lamp body bracket according to claim 7, wherein both ends of the first worm and both ends of the second worm are sleeved with bearing assemblies.

9. The lamp body bracket according to claim 8, wherein:

the bearing assembly comprises a second needle roller bearing and a planar thrust bearing arranged adjacently; and inner walls of the adjusting housing and the mounting housing define a pair of mounting grooves, and the second needle bearing is accommodated in the corresponding mounting groove, the planar thrust bearing is arranged on the outer edge of the mounting groove.

10. The lamp body bracket according to claim 7, wherein:

the main support frame comprises a first support and a second support, and the first support and the second support extend into the inside of the mounting housing respectively by two opposite sides of the mounting housing, and the flexible shaft extends inside the second support;

the first side extension portion is located at an end of the first support away from the mounting housing, and the second side extension portion is located at an end of the second support away from the mounting housing; and a protruding structure is provided on the inner wall of the mounting housing, and the first support is provided with an escape space recessed inward along the radial direction thereof and a lug structure located on one side of the escape space, the first support is crimped to the protruding structure through the escape space, and the lug structure is adapted on the top surface of the protruding structure.

11. A lighting device, comprising:

a lamp body having a light-emitting surface, and a first end and a second end, which are opposite to each other and arranged on two sides of the light-emitting surface of the lamp body, respectively; and a lamp body bracket for supporting a lamp body, comprising:

a main support frame, wherein opposite sides of the main support frame are respectively provided with a first side extension portion and a second side extension portion, and the first side extension portion and the second side extension portion are arranged at intervals;

a first adjusting seat, movably connected to the first side extension; and a shaft assembly;

wherein:

the first adjusting seat is arranged opposite to the second side extension, the first adjusting seat is configured to be in connection with the first end of the lamp body, and the second side extension is configured to be in connection with the second end of the lamp body opposite to the first end;

the first adjusting seat is configured to move toward or away from the second side extension;

one of the first side extension portion and the first adjusting seat defines a hole structure, the other one defines a connecting structure, and one shaft end of the shaft assembly is movably inserted into the hole structure and slides along an axial direction of the hole structure;

the other shaft end of the shaft assembly is fixedly connected to the connecting structure; and one of the shaft assembly and the hole structure is provided with a first limiting portion, and the other one is provided with a second limiting portion, the first limiting portion and the second limiting portion protrude from a peripheral wall of the shaft assembly or the hole structure, the first limiting portion and the second limiting portion are both located on a sliding path of the shaft assembly to resist and limit a sliding stroke of the shaft assembly.

12. A lamp body bracket for supporting a lamp body having a light-emitting surface, and a first end and a second end, which are opposite to each other and arranged on two sides of the light-emitting surface of the lamp body, respectively, the lamp body bracket comprising:

a main support frame, wherein opposite sides of the main support frame are respectively provided with a first side extension portion and a second side extension portion, and the first side extension portion and the second side extension portion are arranged at intervals;

a first adjusting seat, movably connected to the first side extension; and a shaft assembly;

wherein:

the first adjusting seat is arranged opposite to the second side extension, the first adjusting seat is configured to be in connection with the first end of the lamp body, and the second side extension is configured to be in connection with the second end of the lamp body, the first adjusting seat is configured to move toward or away from the second side extension, the lamp body bracket further comprises a second adjusting seat, the second adjusting seat is movably connected to the second side extension portion and arranged opposite to the first adjusting seat, and the second adjusting seat is configured to connect the second end of the lamp body, the second adjusting seat is rotatable around a direction perpendicular to the second side extension portion to adjust a pitching angle of the lamp body relative to the main support frame, the lamp body bracket further comprises an adjusting housing and a pitching drive assembly, and the adjusting housing is connected to the second side extension portion, and the pitching drive assembly comprises:

a first driving member, a first worm, a first worm gear, and an adjusting shaft;

wherein:

the first worm gear and the first worms mesh with each other and are all arranged inside the adjusting housing;

the first driving member is movably connected to the first worm, and one end of the adjusting shaft is inside the adjustment housing and is movably connected to the first worm gear, and the other end is outside the adjustment housing and is movably connected to the second adjustment seat.

13. The lamp body bracket according to claim 12, wherein:

the main support frame further comprises a mounting member, and the mounting member comprises a mounting housing arranged between the first side extension portion and the second side extension portion and a mounting shaft fixedly connected to the mounting housing, the mounting shaft is perpendicular to a connecting line direction of the first adjusting seat and the second adjusting seat;

the lamp body bracket further comprises a rotary drive assembly for driving the mounting shaft to rotate; the rotary drive assembly comprises: a second driving member, an adapter shaft, a flexible shaft, a second worm, and a second worm gear;

the adapter shaft is inside the adjusting housing, and the flexible shaft is inside the main support frame, the second worm and the second worm gear are inside the mounting housing;

the second driving member, the adapter shaft, the flexible shaft, the second worm, the second worm gear, and the mounting shaft are movably connected in order; and the first driving member and the second driving member each comprises at least one of an adjusting knob and a driving motor.

14. The lamp body bracket according to claim 13, wherein both ends of the first worm and both ends of the second worm are sleeved with bearing assemblies.

15. The lamp body bracket according to claim 14, wherein:

the bearing assembly comprises a second needle roller bearing and a planar thrust bearing arranged adjacently; and inner walls of the adjusting housing and the mounting housing define a pair of mounting grooves, and the second needle bearing is accommodated in the corresponding mounting groove, the planar thrust bearing is arranged on the outer edge of the mounting groove.

16. The lamp body bracket according to claim 13, wherein:

the main support frame comprises a first support and a second support, and the first support and the second support extend into the inside of the mounting housing respectively by two opposite sides of the mounting housing, and the flexible shaft extends inside the second support;

the first side extension portion is located at an end of the first support away from the mounting housing, and the second side extension portion is located at an end of the second support away from the mounting housing; and a protruding structure is provided on the inner wall of the mounting housing, and the first support is provided with an escape space recessed inward along the radial direction thereof and a lug structure located on one side of the escape space, the first support is crimped to the protruding structure through the escape space, and the lug structure is adapted on the top surface of the protruding structure.

* * * * *